Dec. 25, 1951 A. MARCHETTI 2,580,112
CYCLE TRAILER HITCH
Filed Jan. 13, 1949 2 SHEETS—SHEET 1
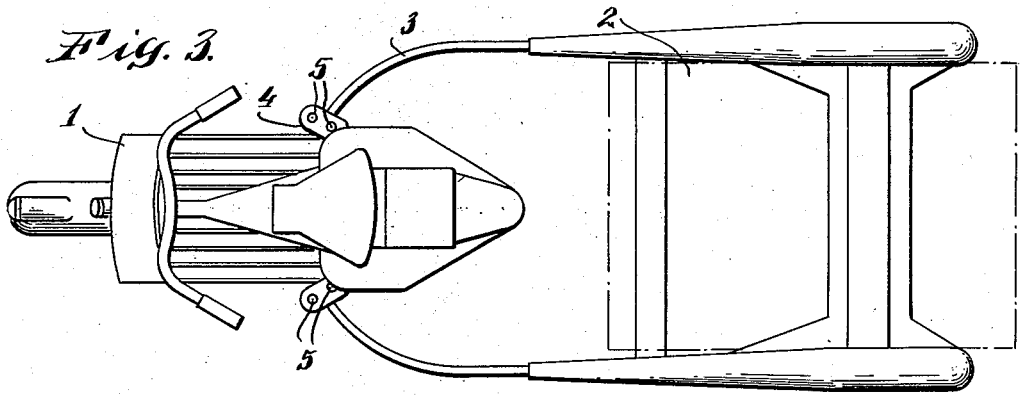
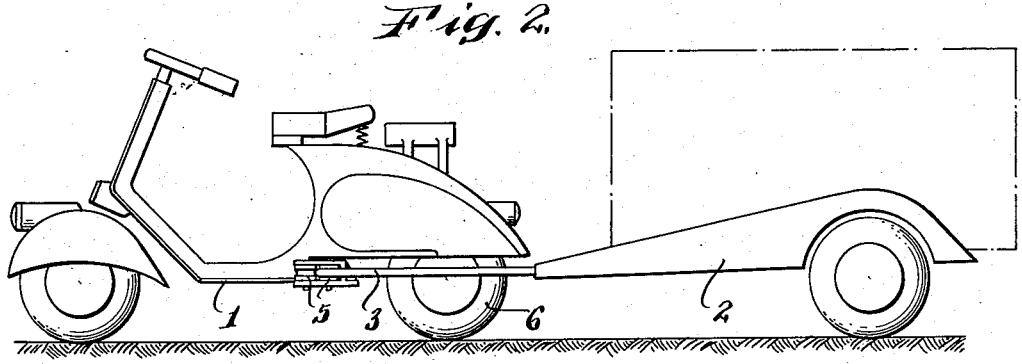
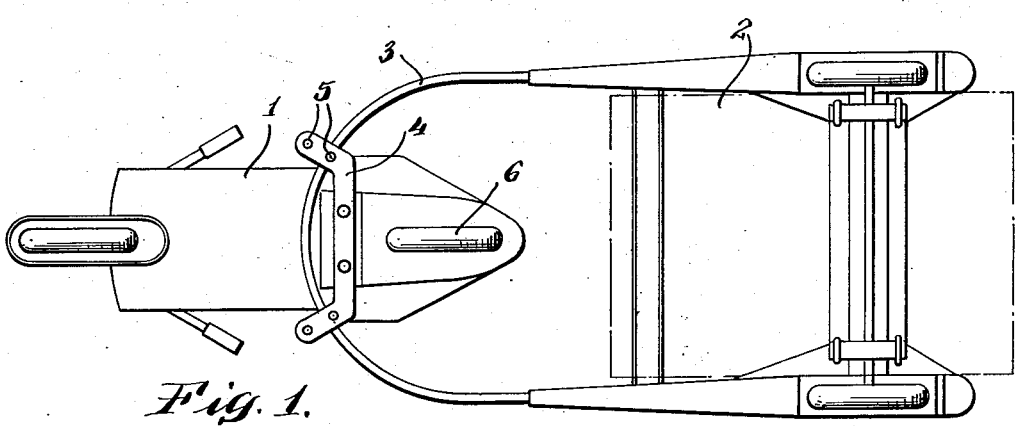
INVENTOR.
AUGUSTO MARCHETTI
BY Haseltine, Lake & Co.
AGENTS.

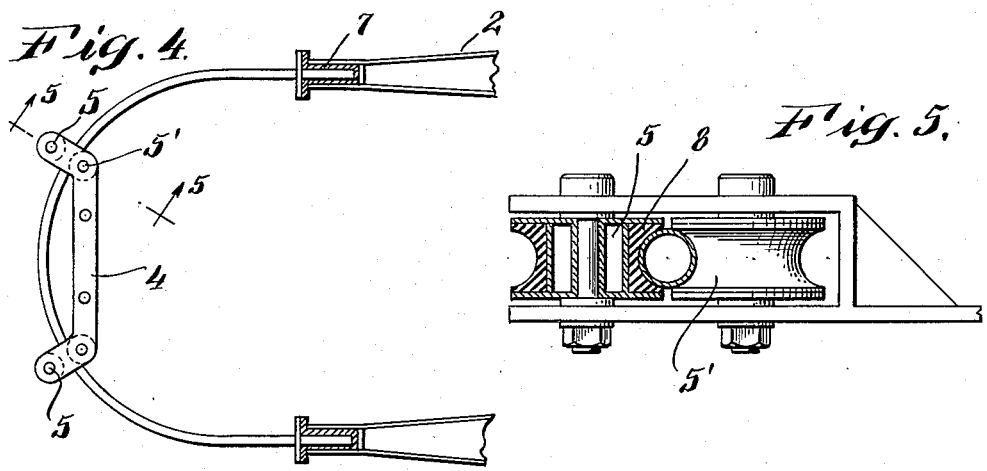
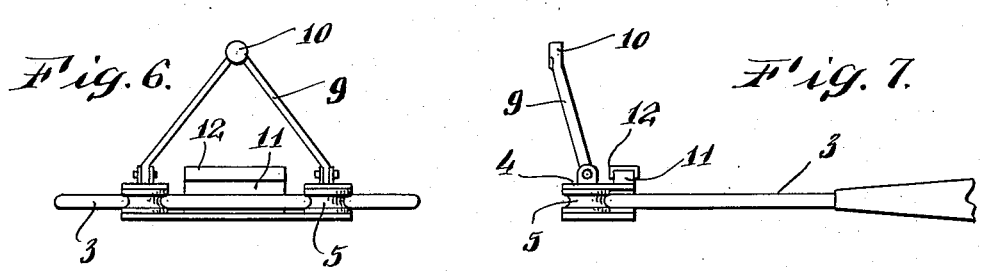
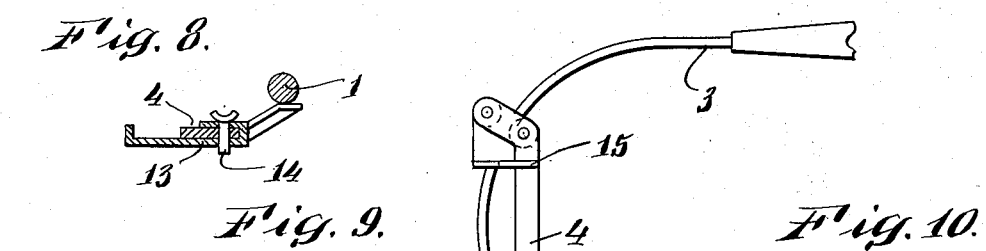
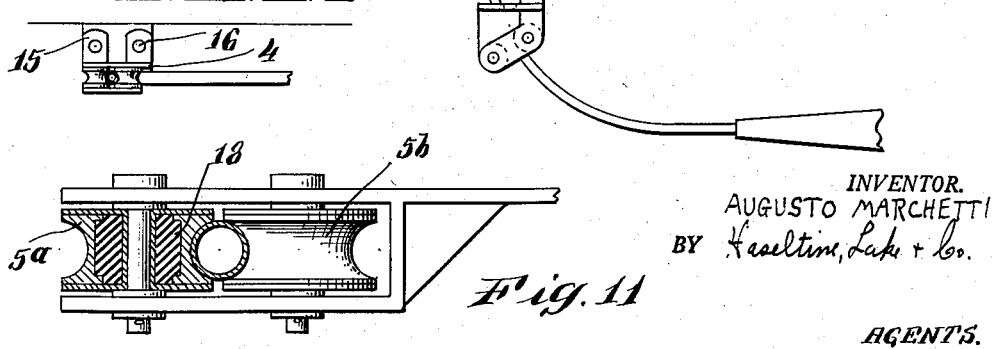

Patented Dec. 25, 1951

2,580,112

UNITED STATES PATENT OFFICE 2,580,112

CYCLE TRAILER HITCH

Augusto Marchetti, Milan, Italy

Application January 13, 1949, Serial No. 70,763
In Italy December 10, 1948

4 Claims. (Cl. 280—204)

1

The present invention relates to hitches for attaching a trailer to a tractor or towing vehicle, and particularly to a hitch assembly for attaching a trailer to a tractor vehicle having two wheels arranged in tandem, such as, for example, a motor cycle, motor bike or scooter.

An object of the present invention is to provide a hitch for attaching a trailer to a tractor vehicle of the described character, wherein the hitching attachment is constructed and arranged so that the trailer and tractor vehicle may be turned relative to each other to facilitate steering of the latter and to provide for the location of the resultant of the forces transmitted by the hitching attachment, in all relative positions of the trailer and tractor vehicle, so that that resultant of the forces passes through or near the point on the tractor vehicle at which the driving and braking forces are applied to thereby avoid the imposition of unbalancing moments upon the tractor vehicle as a consequence of acceleration or deceleration of the hitched together trailer and tractor vehicle.

Another object resides in the provision of a hitching attachment for connecting a trailer to a tractor vehicle of the described character, wherein the hitching attachment is constructed and arranged to cause the resultant of the forces transmitted thereby to pass substantially through the center of the rear wheel of the tractor vehicle.

Since it is structurally impossible to make the axle of the rear wheel of the tractor vehicle coincide with a vertical pivot pin attaching the trailer to the tractor vehicle, the above objects are achieved in accordance with the present invention by providing a hitching attachment having a part secured to the trailer and structure carried by the tractor vehicle at locations remote from the rear wheel of the latter and connected cinematically to the part on the trailer to provide for rotational movement of said part about a center remote from said structure and located substantially at the center of the rear wheel of the tractor vehicle. While a hitching attachment having the above characteristics may take any of several forms, a particularly desirable illustrative embodiment, along with some variations of the details thereof, will be hereinafter described in detail and are shown in the accompanying drawings forming a part hereof and wherein:

Fig. 1 is a bottom plan view of a hitching attachment, constructed according to a preferred embodiment of the present invention, and shown connecting a trailer to a tractor vehicle of the described character;

Fig. 2 is a side elevational view of the hitching

2 attachment and trailer and tractor vehicle connected thereby as shown in Fig. 1;

Fig. 3 is a top plan view of the hitching attachment and trailer and tractor vehicle connected thereby as shown in Fig. 1;

Fig. 4 is a top plan view of the hitching attachment shown connected to portions of the trailer which are broken away to illustrate details of construction of the connection;

Fig. 5 is a transverse sectional view of the hitching attachment taken along the line 5—5 of Fig. 4;

Fig. 6 is a front elevational view of fastening means for securing an hitching attachment embodying the present invention to a tractor vehicle;

Fig. 7 is a side elevational view of the fastening means of Fig. 6;

Fig. 8 is a side elevational view, partly in section, of another fastening means for securing an hitching attachment embodying the present invention to a tractor vehicle;

Fig. 9 is a side elevational view, partly in section, of still another fastening means for securing an hitching attachment embodying the present invention to a tractor vehicle;

Fig. 10 is a top plan view of the fastening means of Fig. 9; and

Fig. 11 is a sectional view, similar to that of Fig. 5, but showing a modification of the hitching attachment.

Referring to the drawings in detail, and initially to Figs. 1, 2 and 3 thereof, a tractor vehicle 1 is there shown and is of the type having two wheels arranged in tandem, such as, for example, a motor scooter or motor cycle. A trailer 2 is also shown and the attachment for hitching the trailer to the tractor vehicle 1 includes an elongated bar 3, which may be tubular, and is preferably U-shaped and formed with a semi-circular central portion. The opposite ends of the U-shaped elongated bar or member 3 are secured to the trailer 2 so that the semi-circular central portion of the bar 3 extends ahead of or in advance of the trailer.

The hitching attachment embodying the present invention further includes a laterally extending plate 4 secured or fastened to the tractor vehicle in a location disposed between the front wheel and rear wheel 6 of the latter and lying substantially in the horizontal plane of the axis of the rear wheel 6. Pairs of rollers 5 and 5' are mounted on the opposite end portions of the plate 4 for rotation about vertical axes and the semi-circular central portion of the bar 3 is slidably received between the rollers 5 and 5' of each of said pairs (Figs. 4 and 5) so that the bar 3, and hence the trailer 2 to which it is secured, is swingable relative to the plate 4, and hence the tractor vehicle 1, around an axis coincidental with the center of the semi-circular central portion of the bar 3.

In order to provide for the passage of the resultant of the transmitted forces through or near the center of the rear wheel 6 of the tractor vehicle, the plate 4 is located so that the center of the semi-circular central portion of the bar 3 slidably received by the rollers 5 and 5' substantially coincides with the center of the rear wheel 6. Thus, it can be seen that in all relative positions of the trailer and tractor vehicle the imposition of unbalancing moments upon the tractor vehicle due to acceleration or deceleration of the assembly is avoided, while the rollers 5 and 5' and the bar 3, slidably received by the latter and constituting the only means for transmitting draft, are remote from the single rear wheel 6 to eliminate any interference with the rotation of the latter.

In order to permit some rolling motion, that is lateral inclination, of the two-wheeled tractor vehicle 1 relative to the trailer 2, the ends of the U-shaped bar 3 are preferably received in bushings 7, carried by the trailer, and formed of rubber or any other suitably resilient, damping material, as in Fig. 4. Further, each of the rollers 5, 5' (Fig. 5) preferably is formed with a grooved peripheral coating 8 of rubber or other resilient material to absorb vibration and to permit some torsional displacement of the parts of the hitching attachment without causing the seizure of the bar 3 within the rollers 5 and 5'.

In place of the roller construction illustrated in Fig. 5, the rollers 5a and 5b of Fig. 11 may be substituted. Each of the rollers 5a and 5b includes a resilient, preferably rubber bushing 18 interposed between the central pin and the roller to provide a yieldable support for the grooved roller body of rigid material in the rotation of the latter.

The plate 4 may be permanently secured to the framework of the tractor vehicle by suitable fastenings, or easily separable fastenings may be provided so that the hitching attachment may be quickly removed from the tractor vehicle when it is desired to separate the trailer from the latter.

Suitable fastening means of separable character are illustrated in Figs. 6 and 7 wherein converging legs 9 extend upwardly from the plate 4 and join at the top to provide a lug 10 which can be removably secured to the rear of the saddle of the tractor vehicle, and a resilient, preferably rubber block 11 is mounted on the top of plate 4 to be received or seated in a downwardly opening channel member 12 which is permanently affixed to the underside of the tractor vehicle.

In Fig. 8 another form of separable attachment for the plate 4 is illustrated and includes a member 13 permanently secured to the tractor vehicle 1 and defining a forwardly opening channel into which the plate 4 may be inserted, and a removable bolt or pin 14 formed to extend through the upper and lower legs of the channel and the plate 4 therebetween.

In Figs. 9 and 10 still another form of separable attachment is illustrated wherein the plate 4 is provided with laterally spaced apart upstanding lugs or ears 15 which are separably attached to the frame of the tractor vehicle by means of removable pins 16.

While the means for slidably receiving the semi-circular central portion of the bar 3 have been described and illustrated as rollers, other means for providing such a slidable connection between the plate 4 and bar 3 may be provided so that the latter continues to turn about the center of its semi-circular central portion.

It is apparent from the foregoing description of illustrative embodiments of the present invention that a hitching attachment has been provided for connecting a trailer to a tractor vehicle having two wheels arranged in tandem without adversely affecting the steering or balancing of the tractor vehicle.

While I have described and illustrated certain embodiments of my invention, it is to be noted that the invention is not limited to such precise embodiments and that many changes and modifications, obvious to one skilled in the art, may be effected therein without departing from the scope or spirit of the invention as defined in the appended claims.

What I claim as my invention and desire to secure by Letters Patent is:

1. An attachment for hitching a trailer to a tractor vehicle having two wheels arranged in tandem; said attachment comprising an elongated element having a semi-circular central portion, means for securing the ends of said elongated member to the trailer with said member extending ahead of the latter, two laterally spaced guide means slidably receiving said semi-circular central portion of the elongated member, and mounting means for securing said guide means on the tractor vehicle at locations intermediate the wheels of the latter and substantially in the horizontal plane of the axis of the rearmost of the wheels of the tractor vehicle, said elongated member and said guide means constituting the sole means for transmitting draft between the tractor vehicle and the trailer.

2. An attachment as set forth in claim 1; wherein each of said guide means includes two grooved rollers respectively engaging said semi-circular central portion at the inside and outside of the latter.

3. An attachment as set forth in claim 2; wherein each of said rollers includes a portion of yieldable material to permit limited rolling motion of the tractor vehicle relative to the attached trailer.

4. An attachment as set forth in claim 1; wherein said guide means are arranged to locate the center of said semi-circular portion of the elongated member substantially at the center of the rearmost wheel of the tractor vehicle.

AUGUSTO MARCHETTI.

REFERENCES CITED

The following references are of record in the file of this patent:

UNITED STATES PATENTS

| Number | Name | Date |
|---|---|---|
| 731,086 | Titus | June 16, 1903 |
| 1,077,878 | Hagan | Nov. 4, 1913 |
| 1,463,097 | Schneider | July 24, 1923 |
| 2,370,988 | Neal | Mar. 6, 1945 |

FOREIGN PATENTS

| Number | Country | Date |
|---|---|---|
| 57,957 | Sweden | Apr. 28, 1919 |
| 362,598 | Italy | Aug. 30, 1938 |
| 760,291 | France | Dec. 6, 1933 |
| 884,631 | France | May 3, 1943 |